(12) United States Patent
Moriarty et al.

(10) Patent No.: US 6,692,670 B2
(45) Date of Patent: Feb. 17, 2004

(54) FIBERBOARD MANUFACTURE USING LOW DIISOCYANATE CONTENT POLYMERIC MDI-CONTAINING BINDERS

(75) Inventors: Christopher J. Moriarty, Mullica Hill, NJ (US); Tina M. Kolaczyk, West Chester, PA (US); Steven B. Burns, Haddonfield, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 528 days.

(21) Appl. No.: 09/766,825

(22) Filed: Jan. 22, 2001

(65) Prior Publication Data

US 2001/0035591 A1 Nov. 1, 2001

Related U.S. Application Data

(63) Continuation of application No. PCT/US99/16845, filed on Jul. 23, 1999.

(60) Provisional application No. 60/094,234, filed on Jul. 27, 1998.

(51) Int. Cl.$^7$ .................. B29B 11/14; B29B 15/10
(52) U.S. Cl. ........................ 264/123; 264/126
(58) Field of Search ................ 264/123, 126

(56) References Cited

U.S. PATENT DOCUMENTS

| | | | | |
|---|---|---|---|---|
| 5,344,484 A | * | 9/1994 | Walsh | 106/164.3 |
| 6,376,582 B1 | * | 4/2002 | Iwata et al. | 524/14 |

* cited by examiner

*Primary Examiner*—Stephen J. Lechert, Jr.
(74) *Attorney, Agent, or Firm*—Nicole Graham

(57) ABSTRACT

The invention relates to modified isocyanates for use in producing fiberboards. Particularly, the invention relates to the use of polymeric MDI having a relatively low diisocyanate content for producing fiberboards. The invention also relates to fiberboards produced utilizing such modified polymeric MDI.

14 Claims, No Drawings

FIBERBOARD MANUFACTURE USING LOW DIISOCYANATE CONTENT POLYMERIC MDI-CONTAINING BINDERS

This application is a continuation of international application number PCT/US99/16845,filed Jul. 23, 1999 which claims the benefit of Provisional application No. 60/094,234 filed Jul. 27, 1998.

TECHNICAL FIELD

The present invention relates generally to the manufacture of synthetic boards having thermosetting binders and, more specifically, to fiberboards having isocyanate binders.

BACKGROUND ART

For many years, fiberboards have been manufactured from wood or agricultural substrates using thermosetting binders. Formaldehyde-based binders, such as urea formaldehyde and melamine formaldehyde have traditionally dominated the fiberboard industry during that time. Isocyanate-based binders, particularly diphenylmethane diisocyanate (MDI) binders, however, offer some significant advantages over formaldehyde-based binders, including superior physical and moisture-resistance properties and the elimination of formaldehyde emission hazards.

Although isocyanate binder technology for fiberboard manufacture has been available for many years, isocyanates have not gained widespread commercial acceptance, primarily because of cost. MDI-based isocyanates tend to be more expensive per pound than formaldehyde-based binders, but are used at a lower dose rate, partially offsetting the cost disadvantage. For example, MDI-based binders generally comprise about 6% of total finished fiberboard weight compared to as much as 20% of total fiberboard weight for urea formaldehyde. Also, in many instances, MDI-based binders cure more slowly than urea formaldehyde or melamine formaldehyde resins.

Fiberboard is typically manufactured via a multi-step process. Typically, wood chips (or other suitable materials) are fed into a digester in order to soften them via exposure to steam and high pressure. This process also breaks down some of the lignin within the wood chips. The treated chips are then fed to a refiner, where they are separated into their component fibers by intense mechanical forces. The hot, wet fibers exit the refiner, and are rapidly transported via steam through a "blowline". Typically, binders are added to the fibers via blowline injection.

The use of low dosage isocyanate-based binders via blowline injection poses a different set of challenges than the dispensation of high dosage formaldehyde based binders. Because such low dosages of isocyanate-based binders are used, great care must be taken to distribute the binder evenly throughout the panel. This task is further complicated by the fact that isocyanates react very quickly with water to form polyureas at elevated temperatures, such as the temperatures experienced in the blowline.

The blowline deposits the binder treated fibers into a dryer, and eventually into forming and pressing devices which produce the final panels. Ideally, polymerization of the binder into its final thermoset form takes place in the hot press, not prior to pressing the fiberboard into its final form. Because isocyanates are so reactive with water at high temperatures, and because water and high temperatures are so prevalent in the fiberboard manufacturing process, it is extremely likely that a great deal of isocyanate is converted to polyurea prior to pressing, which can lead to the formation of solids, which foul the blowline or the dryer. Also, pre-polymerization renders a significant portion of the binder inactive, greatly reducing bonding efficiency. It is also likely that some isocyanate is volitalized in the drying process, and thus lost in the process.

In order to protect isocyanate-based binders from the harsh conditions of the typical fiberboard manufacturing process, emulsifiable isocyanates have been developed. These modified isocyanates can be mixed with water using an in-line static mixer, and subsequently injected into the blowline. Emulsification prevents the build up of isocyanate-water reaction of products on the walls of the blowline and helps to prevent premature reaction of the binder. Emulsification also helps to increase the volume of liquid being dispensed, which helps to achieve a more even distribution of binder throughout the fiberboard. Unfortunately, modifying an isocyanate to make it emulsifiable entails additional manufacturing costs, which make these products less cost effective.

Another cost-disadvantage of isocyanate binders is their need for a release agent, in order to avoid sticking to metal press platens. Formaldehyde based binders do not normally require release agents. In industrial practice, water based release agents are typically emulsified in line with an emulsifiable MDI just prior to isocyanate emulsification, and "blowline" injection. The need for release agent further helps to increase the volume of fluid being dispensed, but adds cost to the system.

All of the technology described above is well known. The process for using isocyanate binders for the production of fiberboard via "blowline" injection is described in, for example, U.S. Pat. No. 4,407,7771, issued to the Celotex Corporation in 1983. The use of emulsifiable isocyanates is described in, for example, U.S. Pat. No. 3,996,154 issued to ICI Americas Inc. in 1976. The use of wax release agents in conjunction with isocyanate binders is described in, for example, U.S. Pat. No. 4,388,138 and U.S. Pat. No. 4,396,673, both issued to ICI Americas Inc. in 1983. The use of an in-line mixing apparatus for dispensing isocyanate binders into the "blowline" of an medium density fiberboard (MDF) manufacturing process is described in, for example, U.S. Pat. No. 5,093,058 issued to the Medite Corporation in 1992.

Despite all of this known technology, the use of isocyanates in fiberboard manufacture had remained minor, because of the various cost effectiveness limitations discussed above. The present invention concerns a novel isocyanate-based composition, and particularly an MDI-based composition, for binding fiberboards, which offers significant advantages over the isocyanate technology available previously.

DISCLOSURE OF THE INVENTION

In accordance with the present invention it has been discovered that improved results are achieved if a binder comprising a polymeric MDI having a relatively low diisocyanate content is employed in the fiberboard manufacturing process.

The method of the invention broadly relates to forming fiberboards comprises the steps of:
1) providing fibers to a blowline;
2) providing a relatively low diisocyanate content polymeric MDI to the blowline to treat the fibers with the polymeric MDI;
3) at least partially drying the treated fibers; and
4) pressing the treated fibers to form the fiberboard.

The present invention also relates to fiberboards fabricated with such binders comprising polymeric MDI.

BEST MODE FOR CARRYING OUT THE INVENTION

As indicated above, processes for preparing fiberboards, such as medium density fiberboards, are known to those skilled in this art. Any of the conventionally employed processes can be used in this invention.

Polymeric MDI (polymethylene polyphenylene polyisocyanate) binders have been used in the preparation of fiberboards. These binders contain a mixture of isocyanates generally including a relatively high content of diisocyanate molecules. For example, commercially available polymeric MDI generally consists of about 48 to 50% diisocyanate molecules, about 22 to 26% triisocyanate molecules, with the remainder consisting of larger oligomers. Examples of such commercially available polymeric MDI is Rubinate 1840 isocyanate and Rubinate M isocyanate, available from Huntsman Polyurethanes located in West Deptford, N.J.

Suitable polymeric MDIs for use in the invention also include emulsifiable, polymeric MDIs. These materials also contain a mixture of isocyanates generally including a relatively high content of diisocyanate molecules, as described above, but are altered by known techniques to be made emulsifiable. An example of such a commercially available emulsifiable, polymeric MDI is Rubinate 1780, available from Huntsman Polyurethanes, located in West Deptford, N.J.

In accordance with this invention it has been discovered that improved results are achieved if the diisocyanate content of the polymeric MDI is reduced. Preferred results are achieved by utilizing a polymeric MDI having a diisocyanate content of less than about 48% by weight. More preferred is a polymeric MDI having a diisocyanate content of about 45% by weight or less. Still more preferred is a polymeric MDI having a diisocyanate content of about 40% by weight of less. With the most preferred polymeric MDI having a diisocyanate content of about 35% by weight or less.

The diisocyanate content can be reduced in any suitable manner. For example there are several techniques known in the art to reduce the diisocyanate content of polymeric MDI.

One such technique is to remove at least some diisocyanate by distillation. A second suitable technique is to convert at least some of the diisocyanate molecules to isocyanurates, also known as trimerized MDI. Each of these techniques is well known to the skilled artisan. Of course, any combinations of suitable techniques for reducing diisocyanate content may be used.

The polymeric MDI may also contain urethane modifications, isocyanurate modifications, biurets, ureas, etc. The polymeric MDI may be modified to be water dispersible, and applied in an aqueous emulsion form. Such a method for modifying the polymeric MDI to be water dispersible is fully disclosed in the above-identified U.S. Pat. No. 3,996,154.

The polymeric MDI may be used alone, or in conjunction with other binder materials, including, but not limited to, formaldehyde containing binder materials, diluents, extenders, fillers, etc. Suitable extenders include, for example, oils, such as soy oil and linseed oil, solvents, lignin, carbohydrates, etc. Suitable fillers include, for example, fiberglass, plastics, waste materials, etc.

Moreover, the polymeric MDI may also include fire retardants, such as, for example, ammonium polyphosphates, trichloropropyl phosphate (TCPP), melamine, triphenyl phosphate, etc.

Furthermore, the polymeric MDI may also include suitable release agents, such as, for example, soaps, fatty acids, waxes, silicones, fatty acid salts, etc.

Additionally, the polymeric MDI may also include biocides, such as boric acid, etc.

The preferred fiberboard products are manufactured from wood fibers, although other cellulosic fibers may also be used, including those manufactured from agricultural products.

As stated above, the invention broadly relates to forming fiberboard, and particularly medium density fiberboard. Processes for production of medium density fiberboard are well known to the skilled artisan and include the blowline addition of isocyanate binders. Such a process is described, generally, below.

In producing medium density fiberboard, a polyisocyanate resin is applied directly to the hot and wet fiber material in the blowline out of the refiner of a fiberboard manufacturing plant. Generally, wood chips are first screened to remove therefrom both oversized and undersized material, e.g., fines and dirt. The chips also can be subjected to a preliminary washing step.

The cleaned chips are conveyed to storage bins that feed pressurized digester-refiner systems, which can be of a conventional design. The pressurized refiners refine the raw woody material into fiber under steam pressure. The wood chips pass from the steam-pressurized digester into the refining section while still under pressure, and this pressure is maintained during the refining.

A digester is provided for pre-steaming of the raw chips. Advantageously, molten wax is metered onto the chips as they are fed to the digester. Generally, steaming in the digester is carried out for about five to ten minutes at a suitable pressure of about 5.5 to 8.3 bars.

As the chips emerge from the digester, they pass through a refiner, which is also operated under steam pressure. The chips are shredded into fibers in the refiner and then blown through an orifice (i.e., the blowvalve) out of the refiner to the "blowline". Typically, the steam pressure in the refiner can be from about 5.5 to 10.3 bars, with temperatures ranging from about 140 to 205 C. The fibers which emerge from the refiner into the blowline are, generally, at a moisture content of 50% or higher by weight, as, e.g., 50–60%, based on the total solids weight, and a temperature of at least about 100 to 204 C, generally above about 118 C. After refining, the stock and steam are conveyed through the blowline to a flash tube dryer, where the fiber moisture content is reduced to about 2 to 20% by weight.

As stated above, the present invention relates to introducing a relatively low diisocyanate content polymeric MDI-base binder into the blowline. The low diisocyanate content polymeric MDI-based binder (which at this point can be emulsified with water or release agents) is added to the blowline to treat the hot fiber emerging from the refiner with the low diisocyanate content polymeric MDI.

Typically, the treated fiber is in an air stream tube dryer for about 30 seconds, during which time it is at a temperature of about 38 to 260 C.

After refining, treating with the binder, and drying, the fiber and air are separated via a separator air cyclone. Next, the fiber is transported to mechanical formers that uniformly lay down the fiber on to a moving forming line.

The mat can subsequently be fed to a pre-compressor to make the mat more handleable in subsequent processing. After pre-compression, the mat is cut into desired lengths and fed into a conventional board-forming press, such as a typical medium density fiberboard press having multiple steam or oil heated platens, or a continuous press which consolidates the mat between two opposing steel belts. The press consolidates and compresses the mat to the desired thickness while the heat cures the binder composition. Typically, during the pressing operation the mats are generally heated to a temperature of about 121 to 232 C, as they are being compressed at about 6.9 to 69 bars of pressure. Pressing times are typically about 2 to 10 minutes.

The above-described process of forming medium density fiberboard is intended to be illustrative and should not be construed as limiting the present invention. The invention relates to the realization that a relatively low diisocyanate containing polymeric MDI-containing binder can be introduced in the blowline of any suitable fiberboard production process. The invention also relates to fiberboards produced by such a process.

The quantity of binder material needed in a particular application can be determined by simple experimentation. An application of from about 1 to 20%, preferably from about 2 to 10%, and more preferably from about 4 to 7%, based on the oven dry weight of the fiber is generally employed.

Significantly faster line speeds have been achieved with the low diisocyanate content polymeric MDI-containing binders of the present invention- a significant cost savings. In addition, the polymeric MDI-containing binders of the invention result in superior physical and mechanical properties in the resulting fiberboard product. For example, fiberboards with higher internal bond strength and reduced edge swelling can be produced as compared to fiberboards produced with conventional, commercially available polymeric MDI-containing binders.

The following examples are provided to further illustrate the invention and should not be construed as limiting the invention.

EXAMPLES

Sample Binders 1, 2, and 3 were based on commercially available Rubinate M isocyanates (available from Huntsman Polyurethanes, located in West Deptford, N.J.) which were subsequently modified to comprise relatively low diisocyanate content polymeric MDI binders. However, after modifying the diisocyanate content, the Samples were modified to be water emulsifiable substantially by the methods disclosed in U.S. Pat. No. 3,996,154, discussed above. Comparative Sample Binder 4 comprised a representative commercially available emulsifiable, polymeric MDI binder having a relatively high diisocyanate content. Specifically, Comparative Sample Binder 4 was commercially available Rubinate 1780 isocyanate having a diisocyanate content of about 48%, based on weight.

Prior to making Sample Binders 1, 2, and 3, emulsifiable, the Sample Binders were modified to reduce their diisocyanate content. Specifically, the diisocyanate content of Sample Binders 1, 2 and 3 was reduced through a combination of distillation and trimerization steps to obtain the characteristics which are listed in Table I.

TABLE I

| Sample Binder | Viscosity (cps) | % by weight diisocyanate | % by weight triisocyanate |
| --- | --- | --- | --- |
| Sample Binder # 1 | 680 | 33.21 | 22.55 |

TABLE I-continued

| Sample Binder | Viscosity (cps) | % by weight diisocyanate | % by weight triisocyanate |
| --- | --- | --- | --- |
| Sample Binder # 2 | 762 | 31.01 | 21.06 |
| Sample Binder # 3 | 1616 | 32.75 | 21.89 |
| Comp. Sample Binder # 4 | 217 | 48.03 | 25.81 |

Fiberboards were produced utilizing each of the sample binders as follows. Wood chips comprising a virgin softwood mix, with average chip sizes being about 1.5×0.75×0.2 inches, were fed into a hopper, which then fed the wood chips into a wood digester. In the digester, the wood chips were cooked at a pressure of about 6 bar, and at a temperature of about 160 C. to soften the wood chips and prepare them for defiberization. Next, the wood chips were fed between two refining plates (one stationary and the other rotating at about 1450 rpm), where the individual fibers and fiber bundles were separated by mechanical grinding. Following this, the fibers were transported through a blow valve to a blowline. The blowline was approximately 16 mm in diameter and 9 meters in length where the fibers traveled in a saturated steam environment at near sonic speed with a consistency of about 1 to 2% fiber by volume.

Each sample binder was emulsified with water at an about 1:1 ratio by weight and injected into the blowline to treat the fibers by mixing the fibers with the emulsified sample binders. During this stage, the wood flow rate through the blowline was about 100 Kg per hour and the emulsified sample binder flow rate was about 100 g per minute. After treating the fibers with the emulsified sample binders, the treated fibers were passed through an about 2.7 meter diameter by about 89 meter in length flash-tube dryer at temperatures of about 90 C. inlet and about 55 C. outlet temperature, thus reducing the moisture content of the treated fibers to about 12 to 14 percent (oven dry basis, which was calculated by dividing the weight of the dryed wood by the weight of the water in the wet wood and multiplying by 100).

The dried, treated fiber was then collected in a storage bin prior to mat formation. Mats were then formed, weighed and pre-compressed on a continuous compression belt on line to consolidate the fiber mats, and cut to press-length size. Next, the pre-compressed mats were subjected to a final pressing step in a heated press consisting of two platens which were each covered with silicone release paper. The closing of the press consisted of a two-stage close, followed by a hold at final position, and then a decompression stage to allow for a slow release of steam pressure. The fiberboards were pressed to a thickness of about 9 mm. Three test were produced with each of Sample Binders 1, 2 and 3 at press factors of 6, 8, and 12 seconds per mm of fiberboard thickness (i.e., pressing time of about 54, 72 and 108 seconds, respectively) to produce Test Fiberboards #1, #2, and #3, respectively, for each binder.

Several attempts to produce fiberboards with Comparative Sample Binder 4 at a press factor of 6 (Test Fiberboard #1) resulted in consistent delamination of the panel, thus demonstrating that the present invention provides for faster curing times as compared to using conventional polymeric MDI-based binders. Therefore, three test fiberboards were produced with Comparative Sample Binder 4 at press factors of 7, 8, and 12 seconds per mm of fiberboard thickness to produce Test Fiberboards #2, #3 and #4, respectively.

The Test Fiberboards were then each tested for physical and mechanical properties in accordance with ASTM D-1037. Table II sets forth the thickness swell and internal bond strength, as measured in accordance with ASTM D-1037, of each of the Test Fiberboards and clearly shows that fiberboards produced in accordance with the present invention resulted in superior properties when compared to fiberboards produced with conventional polymeric MDI-based binder materials.

TABLE II

| Test Fiberboard | Press Factor (sec/mm) | Density (Kg/m$^3$) | Thickness (Swell %) | Internal Bond Strength (N/mm2) |
|---|---|---|---|---|
| Sample Binder #1 | — | — | — | — |
| Test Fiberboard #1 | 6 | 804 | 8.3 | 0.80 |
| Test Fiberboard #2 | 8 | 818 | 9.5 | 0.98 |
| Test Fiberboard #3 | 12 | 804 | 10.2 | 0.82 |
| Sample Binder #2 | — | — | — | — |
| Test Fiberboard #1 | 6 | 797 | 8.2 | 0.77 |
| Test Fiberboard #2 | 8 | 844 | 9.8 | 1.2 |
| Test Fiberboard #3 | 12 | 790 | 10.8 | 0.85 |
| Sample Binder #3 | — | — | — | — |
| Test Fiberboard #1 | 6 | 804 | 7.1 | 0.72 |
| Test Fiberboard #2 | 8 | 867 | 7.2 | 1.16 |
| Test Fiberboard #3 | 12 | 789 | 9.2 | 0.81 |
| Comp. Sample Binder #4 | — | — | — | — |
| Test Fiberboard #1 | 6 | — | Delamination | Delamination |
| Test Fiberboard #2 | 7 | 829 | 9.1 | 1.02 |
| Test Fiberboard #3 | 8 | 830 | 10.0 | 0.86 |
| Test Fiberboard #4 | 12 | 791 | 10.8 | 0.59 |

We claim:

1. A method for producing a fiberboard comprising:
   a.) providing fibers to a blowline;
   b.) providing a polymeric MDI containing binder having a diisocyanate content of less than about 48% by weight to the blowline to treat the fibers;
   c.) at least partially drying the treated fibers; and
   d.) pressing the treated fibers to form a fiberboard.

2. The method of claim 1, wherein the polymeric MDI containing binder has a diisocyanate content of about 45% by weight or less.

3. The method of claim 2, wherein the polymeric MDI containing binder has a diisocyanate content of about 40% by weight or less.

4. The method of claim 3, wherein the polymeric MDI containing binder has a diisocyanate content of about 35% by weight or less.

5. The method of claim 1, wherein the polymeric MDI containing binder is emulsifiable.

6. The method of claim 5, wherein the emulsifiable polymeric MDI is emulsified.

7. The method of claim 1, wherein the polymeric MDI containing binder is urethane-modified.

8. The method of claim 1, wherein the polymeric MDI contains isocyanurate modification.

9. The method of claim 1, wherein the fibers comprise cellulosic fibers.

10. The method of claim 9, wherein the cellulosic fibers are selected from the group consisting of wood fibers, agricultural fibers, and mixtures thereof.

11. The method of claim 1, wherein the polymeric MDI further includes at least one fire retardant.

12. The method of claim 11, wherein the at least one fire retardant is selected from the group consisting of ammonium polyphosphates, trichloropropyl phosphate, melamine, and triphenyl phosphate.

13. The method of claim 1, wherein the polymeric MDI further includes at least one release agent.

14. The method of claim 13, wherein the at least one release agent is selected from the group consisting of soaps, fatty acids, waxes, silicones, and fatty acid salts.

* * * * *